Patented Jan. 28, 1936

2,028,914

UNITED STATES PATENT OFFICE 2,028,914

PRODUCTION OF RESIN LIKE MATERIALS

William A. Noyes, Urbana, Ill., and Gilbert F. Hoffmann, Milwaukee, Wis., assignors to Pittsburgh Plate Glass Company, a corporation of Pennsylvania No Drawing. Application June 27, 1929,
Serial No. 374,265

7 Claims. (Cl. 260—8)

The present invention relates to improvements in hard soluble resin mixed materials, suitable for use in the production of lacquers, and more particularly in such resin-like materials of the character described in the co-pending application of one of us, Serial No. 373,948, filed June 26, 1929.

In accordance with the present invention, the resin-like material is produced by reaction of an ester of a polyhydric alcohol and a monobasic aliphatic acid with a polybasic acid anhydride.

A typical compound in accordance with the present invention may be obtained by admixing approximately equimolecular proportions of monoacetin and phthalic anhydride, the reaction beginning at temperatures of 150 to 160° C. and the temperature increasing during reaction to 250 to 300° C., which temperatures it should not be permitted to exceed. The reaction mixture may be heated in an open vessel, if desired, as under proper conditions of operation, disagreeable or dangerous fumes are not evolved.

The resin-like material resulting from the reaction is similar to that described in the prior application of one of us hereinbefore referred to, a lighter colored product being, however, secured. The product is hard, and soluble in the desirable lacquer solvents, such as acetone, toluene, xylene, ethyl and butyl acetate and the like, and is a solvent for nitrocellulose, cellulose acetate and other cellulose esters, and imparts desirable qualities to lacquers containing such cellulose compounds. Its solutions have a high degree of mobility, so that large proportions of the resin-like material, say up to 50 to 60%, may be incorporated into solutions suitable for spray or brush application.

The reaction may be similarly conducted, for example, between diacetin and phthalic anhydride in the proportions of one mol. of the former to ½ mol. of the latter. The resulting resin-like product, which is somewhat softer than the product resulting from the reaction with monoacetin, has a somewhat higher plasticizing action when used with cellulose esters, such as nitrocellulose, cellulose acetate and the like, and is soluble in ordinary lacquer solvents, such as those above referred to in connection with the product derived from monoacetin.

It is readily apparent that, in place of the acetic acid esters of glycerol, esters of other monobasic acids such as butyric acid, propionic acid, acryllic acid or the like with glycerol or other polyhydric alcohols, such as glycol or mannitol may be employed. Such esters may be suitably produced by a preliminary reaction between the polyhydric alcohol and the monobasic acid. In place of phthalic anhydride, other anhydrides of polybasic acids may be employed, such as those of succinic and maleic acids.

It has also been found that the reaction between the polyhydric alcohol and the monobasic acid anhydride may be effected simultaneously with the reaction with the polybasic acid anhydride. Thus, 92 parts of glycerol, 148 parts of phthalic anhydride and 102 parts of acetic anhydride are mixed and heated gently under a reflux condenser until the initial vigorous reaction is completed. The water and acetic acid formed are then removed by distillation and the product is hardened by heating it at temperatures of 160 to 250 to 300° C. in an open receptacle until hardened. In carrying out the reaction in this manner, the reactive proportions of the constituents may, of course, be varied; for example, the proportions of the anhydride of the monobasic may be greater and that of the polybasic acid anhydride less than in the example set forth. The operation just described in connection with specific materials, may be employed in producing similar products from other polyhydric alcohols, dibasic acid anhydrides and monobasic acid anhydrides, such as those hereinbefore referred to.

What we regard as new, and desire to secure by Letters Patent, is:

1. The method of producing a soluble resin-like material which comprises reacting upon an ester capable of further esterification of a polyhydric alcohol and an aliphatic monobasic acid having less than five carbon atoms with an anhydride of an organic dibasic acid.

2. The method of producing a soluble resin-like material which comprises reacting upon an acetic acid ester capable of further esterification of a polyhydric alcohol with an anhydride of an organic dibasic acid.

3. The method of producing a soluble resin-like material which comprises reacting upon an acetic acid ester of glycerol with an anhydride of an organic dibasic acid.

4. The method of producing a soluble resin-like material which comprises reacting upon an acetic acid ester of glycerol with phthalic anhydride.

5. The method of producing a resin-like material which comprises reacting upon monoacetin with phthalic anhydride.

6. The method of producing a soluble resin-like material which comprises intermixing a polyhydric alcohol, an anhydride of an aliphatic monobasic acid and an anhydride of an organic polybasic acid, and heating the mixture, thereby simultaneously forming an ester of the monobasic acid with the polyhydric alcohol and reacting thereupon with the anhydride of the polybasic acid.

7. The method of producing a soluble resin-like material which comprises intermixing glycerol, acetic anhydride and the anhydride of an organic polybasic acid, and heating the mixture, thereby forming an acetin and simultaneously reacting thereupon with the phthalic anhydride of the polybasic acid.

WILLIAM A. NOYES.
GILBERT F. HOFFMANN.